United States Patent [19]

Nelsen et al.

[11] 4,264,678

[45] Apr. 28, 1981

[54] CORE-SHELL POLYMERS

[75] Inventors: Suzanne Nelsen, Bergenfield, N.J.; Edward Wotier, Chattanooga, Tenn.; Dru Alwani; Yehuda Ozari, both of Wayne, N.J.

[73] Assignee: GAF Corporation, New York, N.Y.

[21] Appl. No.: 43,161

[22] Filed: May 29, 1979

[51] Int. Cl.$^3$ .............................. B32B 27/02
[52] U.S. Cl. ................................ 428/407; 106/23; 427/282; 428/515; 428/520; 525/301; 525/308; 525/902
[58] Field of Search ................ 427/282; 106/23; 428/515, 407, 520; 525/902, 301, 308

[56] References Cited

U.S. PATENT DOCUMENTS

| | | | |
|---|---|---|---|
| 3,393,615 | 7/1968 | Micheln | 427/282 |
| 3,844,816 | 10/1974 | Vassiliades | 428/407 |
| 3,914,338 | 10/1975 | Kreig et al. | 525/902 |
| 4,076,567 | 2/1978 | Yoshikawa | 427/282 |
| 4,091,162 | 5/1978 | Henderson et al. | 428/407 |
| 4,113,917 | 9/1978 | Tugukuni et al. | 428/407 |

FOREIGN PATENT DOCUMENTS

| | | | |
|---|---|---|---|
| 49-20075 | 5/1974 | Japan | 525/902 |
| 49-20628 | 5/1974 | Japan | 525/902 |

*Primary Examiner*—Ralph S. Kendall
*Assistant Examiner*—Janyce A. Bell
*Attorney, Agent, or Firm*—James Magee, Jr.; Sheldon H. Parker

[57] ABSTRACT

Disclosed are improved core-shell polymer compositions and an improved process for applying patterns to textiles by screen printing employing these polymer compositions as binders. The polymer comprises a core of styrene-butadiene copolymer which is at least partially encased by an integral shell of a copolymer of butyl methacrylate and methyl acrylate. When used as a binder in a screen printing process, this composition produces textiles which exhibit a surprisingly desirable combination of the properties of crock fastness, cyclic aging and hand.

11 Claims, No Drawings

CORE-SHELL POLYMERS

BACKGROUND OF THE INVENTION

The present invention relates to improved core-shell polymers of the type disclosed in concurrently filed U.S. Patent Application Ser. No. 115,824 filed Jan. 28, 1980 entitled "CORE-SHELL POLYMERS AND PROCESS"; and more particularly, the invention relates to core-shell polymers of this type which have superior properties as screen print binders.

In the above-identified, related application, there is disclosed a new organic high polymer composition and a process for preparing it. The composition disclosed therein comprises discrete particles having cores of one polymer completely covered with shells of a different polymer. The shell will preferably be a methyl methacrylate, ethyl methacrylate, butyl methacrylate, or mixed alkyl acrylate and/or alkyl methacrylate polymer. The core will proferably be a styrene-butadiene (SBR) copolymer. By properly selecting the shell monomer, core particle size and reaction conditions to provide a core/shell number of greater than 10, it is possible to concentrate the shell polymer on the outside of the core and leave the center of the core free from shell polymer. These polymers were suggested for use as screen print binders and those having styrene-butadiene copolymer cores and polyalkyl acrylate/methacrylate shells were specifically found usable for this purpose because they exhibit better cyclic aging and redispersion properties than the styrene-butadiene copolymer by itself and are less expensive than the polyalkyl acrylate/methacrylate alone.

Screen printing is a process for applying patterns to textile materials. According to this procedure, a rotary drum having a screen printing mask similar to a silk screening mask, is brought into contact with a fabric and has a composition comprising an aqueous dispersion of pigment and binder applied to the outside of the mask. The composition is applied in a predetermined pattern by virtue of the printing mask and the patterned fabric is then heated to fix the design on the fabric.

While screen print binder compositions comprising core-shell polymers of the type described in the above-identified application have a desirable balance of cyclic aging, redispersibility and cost, experience has shown that most of the compositions disclosed therein cause the textile material to which they are applied to become unduly stiff. It is desirable in many situations, and essential in some, that the printed fabric be pliable and have good draping characteristics.

SUMMARY OF THE INVENTION

Accordingly, it is an object of the present invention to provide improved core-shell polymer compositions particularly suited for use as screen print binders.

It is another object of the present invention to provide an improved process for screen printing on textiles employing an improved screen print binder.

It is a more specific object of the present invention to provide an improved screen print binder composition which combines the necessary properties of crock fastness and cyclic aging with improved softness and feel in the hand.

It is a still more specific object of the present invention to provide an improved screen printing process which will produce printed textiles having good crock fastness and cyclic aging with good softness in the hand.

These and other objects are accomplished according to the present invention which provides a new core-shell polymer composition and a screen printing process employing it. The composition comprises: (a) 70 to 92% based on the dry weight of the composition of discrete cores of styrene-butadiene copolymer comprising from 20 to 60% by weight of the core of styrene, from 40 to 80% by weight of the core of butadiene and from 0 to 10% by weight of the core of a copolymerizable carboxylic acid; and (b) 8 to 30% based on the dry weight of the composition of shells of a copolymer of butyl methacrylate and methyl acrylate formed integrally with and at least partly covering the cores, the copolymer comprising from 45 to 55% by weight of the shell of butyl methacrylate, from 35 to 45% by weight of the shell of methyl acrylate and from 0 to 10% based on the weight of the shell of methacrylic acid. The process comprises: (a) forming a dispersion of a pigment, thickening agent, and composition defined above; (b) contacting a textile with a screen printing mask having a predetermined pattern therein; (c) passing the dispersion through the predetermined pattern and onto the textile; and (d) heating the fabric to fuse the binder and fix the pigment to the textile.

DETAILED DESCRIPTION OF THE INVENTION

The improved polymers of the present invention are true core-shell polymers which, when employed in screen printing of textiles as screen print binders, provide superior properties in the final textile. Textiles printed with these compositions as binders have very good crock fastness, both wet and dry as well as good cyclic aging. Quite unexpectedly, these textiles also are very soft when felt in the hand and drape and flow naturally. The reason for the unexpectedly good hand of materials printed with these polymer compositions as binders is unexpected, especially because a large variety of other similar core-shell polymers do not provide such superior results.

The core portion of the polymer composition of the present invention will comprise from about 70 to about 92% based on the dry weight of the total composition, of discrete cores of styrene-butadiene copolymer. Preferably, the composition will contain from 80 to 90% of the styrene-butadiene copolymer. The core will also preferably comprise a copolymerizable carboxylic acid to add cohesive strength to the copolymer. Over this the shell portion, which will comprise from 8 to 30%, based on the dry weight of the total composition, will be formed. The monomers for forming the shell and the reaction conditions will be selected to provide the proper balance between rate of diffusivity into the core and rate of polymerization as set forth in the above-identified copending application.

The styrene-butadiene copolymer will preferably be made up from a mixture of monomers effective to provide from about 20 to 60% by weight of the core of styrene, from 40 to 80% by weight of the core of butadiene and from 0 to 10% by weight of the core of the copolymerizable carboxylic acid. Preferably, the styrene will comprise from 20 to 37% by weight of the core, the butadiene will comprise from 53 to 70% by weight of the core and the copolymerizable carboxylic acid will comprise 1 to 5% of the weight of the core. The copolymerizable carboxylic acid can be any of those known in the art for this particular function and will typically be itaconic acid, methacrylic acid, fumaric acid, acrylic acid or maleic anhydride. Preferably, the carboxylic acid will be a member selected from the group consisting of itaconic acid, methacrylic acid and combinations of these. The most preferred carboxylic acid will be a combination of itaconic and methacrylic acids.

The process for polymerizing the styrene-butadiene copolymer is well known in the art. One suitable method is that described at page 325 in Bovey et al, Emulsion Polymerization, 1955, published by Interscience Publishers, Inc. Typically, it entails obtaining an emulsion of the desired monomers in the desired percentages and polymerizing onto a seed polymer. The formation of the styrene-butadiene copolymer core portion of the polymer compositions of this invention does not in and of itself form a part of this invention and can be accomplished according to known techniques.

The shell portion of the composition of this invention will typically comprise from 8 to 30%, based on the dry weight of the total composition, and will be a copolymer of butyl methacrylate and methyl acrylate. Surprisingly, it is found that amounts of shell polymer less than those necessary to fully cover the cores can be employed with good results. The shell is formed integrally with and at least partly covers the core to increase the hydrophilicity thereof to make it an effective screen printing binder. The shell is prepared as described in the above-identified copending application, varying the amount of monomer to obtain the desired degree of shell formation, which is hereby incorporated by reference. The shell will preferably comprise from 10 to 28% of the total composition. The copolymer forming the shell will be made of the appropriate monomers to obtain from 45 to 55% by weight of the shell of butyl methacrylate, from 35 to 45% by weight of the shell of methyl acrylate, and from 0 to 10% based on the weight of the shell of methacrylic acid. (The acid improves adhesion to the fabric). In the more preferred aspects of the present invention the butylmethacrylate will be present in an amount of from about 47 to 52% by weight of the shell, the methyl acrylate will be present in an amount of from about 37 to 42% by weight of the shell and the methacrylic acid will be present in an amount of from 1 to 5% based on the weight of the shell.

The shell-forming materials are copolymerized in the presence of the cores in aqueous dispersion under conditions generally acceptable and known in the art for copolymerizing the monomers involved. The example which follows shows one representative procedure, but is not meant to be limiting as other procedures and variations of it can be employed.

The discrete particles of core-shell polymer formed according to this invention will typically be of about the same average size with the discrete particles having a number average diameter of within the range of from 0.1 to 0.5 micron. The ratio of the number average diameter to the weight average diameter gives a measure of the dispersity of particle size. Typically, the ratio will be within the range of from about 1.001 to about 5. The preferred ratios will be within the range of from about 1.001 to about 1.5.

Once formed, the discrete composite particles of the polymer composition of the present invention can be dried and then easily redispersed in water or a polar solvent such as dimethylformamide at the time of use. A typical composition employed for screen printing of textiles will comprise from about 1 to about 15 weight percent of the core-shell polymer composition of this invention, from about 50 to about 90% water, from about 1 to about 15% of a pigment, and from about 0 to about 50% of an organic solvent such as varsol (a mixture of aliphatic hydrocarbons), and from about 0.25 to 10% of a suitable thickener known to the art. If the polymer composition of the present invention had been dried prior to redispersion, it may be necessary to homogenize the dispersion by mixing up to 30 minutes with a homogenizer to properly form the dispersion.

In applying colored patterns to textiles by the process of screen printing employing the improved polymer compositions of the present invention, it is first necessary to form a dispersion of the pigment, thickener and the polymer composition in water. This composition will typically have a solids content of from about 5 to about 15% and will have a ratio of pigment to binder in the range of from about 1 to about 20%. A screen printing mask having a predetermined pattern is contacted with a textile preferably under light pressure as is known in the art. Then, the dispersion of pigment and polymer composition is applied to the screen printing mask by pouring the paste on the screen. The dispersion passes through the screen mask and imparts the predetermined pattern to the textile. To fix the pigment to the textile, the fabric is typically heated to fuse the binder and simultaneously fix the pigment to the textile. This is normally done by heating to a temperature from about 100° to about 200° C. in an air oven for about 1 to about 20 minutes, preferably about 5 minutes. Textiles patterned in this manner have good crock fastness both wet and dry, good cyclic aging, and good hand.

The following example is presented for the purpose of further illustrating and explaining the present invention and is not to be taken as limiting in any regard. Unless otherwise indicated, all parts and percentages are by weight.

EXAMPLE

This example describes the preparation of a core-shell polymer composition according to the present invention which is particularly suitable for screen mask printing of designs on textile fabrics. The core is prepared of a styrene-butadiene-itaconic acid-methacrylic acid random copolymer and the shell is prepared by polymerizing over the core a monomer mixture comprising methyl acrylate, butyl methacrylate, methacrylic acid, and 2-hydroxy-4-allyloxy benzophenone as an ultraviolet light absorber. The use of the ultraviolet light absorber is optional but its use is generally considered preferable. The core polymer can also contain an antioxidant if desired.

To prepare the core emulsion, the following materials are sequentially charged into a 1 gallon high pressure kettle equiped with a mechanical stirrer, thermometer, pressure gauge and three charging inlets:

| Charge No. | Ingredients | % in H$_2$O | Weight (g) |
| --- | --- | --- | --- |
| A-1 | Water (distilled) | | 763.3 |
| | Hampene-100 (EDTA) (chelating agent) | 38 | 1.8 |
| | Itaconic acid | — | 15.0 |
| | Monawet MB-45 Diisobutyl sodium sulfo succinate (surfactant) | 45 | 8.9 |
| | SBR Seed latex | 42 | 72.5 |

-continued

| Charge No. | Ingredients | % in H₂O | Weight (g) |
|---|---|---|---|
| A-2 | Water (distilled) | | 41.5 |
| | Ammonium persulfate | — | 2.0 |
| B-1 | Styrene | — | 323.7 |
| | Butadiene | — | 512.5 |
| | Methacrylic acid | — | 10.0 |
| | Tertiary dodecyl mercaptan | — | 4.0 |
| | 2,4,6-styrenated phenol (antioxidant) | — | 5.8 |
| B-2 | Water (distilled) | | 175.9 |
| | Sodium hydroxide | 20 | 15.0 |
| | Ammonium persulfate | — | 5.0 |
| | Monawet MB-45 Diisobutyl sodium sulfo succinate (surfactant) | 45 | 8.0 |

These materials are added and processed in the following stagewise procedure:

(1) Charge A-1 is added to the kettle.
(2) The kettle is purged with nitrogen by first evacuating the kettle to 5" vacuum, then breaking the vacuum with nitrogen, and building pressure up to 25 psi. This sequence is repeated twice.
(3) Agitation is started at 300 RPM.
(4) Temperature of the contents of the kettle is raised to 180° F. in 20 minutes.
(5) When temperature reaches 180° F., the reaction is started by adding A-2 in one shot, and then
(6) Starting the Charges B-1 and B-2 from two separate inlets.
(7) Addition of B-1 and B-2 is completed in four hours, while maintaining temperature at 180° F.

At the end of 4.0 hours, the preparation of the core portion of the composition is complete. The resulting core material contains 34.8 parts styrene and 55.0 parts butadiene.

To form the shell on the core, the following further materials are added stagewise:

| Charge No. | Ingredients | % in H₂0 | Weight (g) |
|---|---|---|---|
| B-3 | Water (distilled) | | 333.8 |
| | Ammonium persulfate | — | 2.2 |
| B-4 | Butyl methacrylate | — | 57.0 |
| | Methyl acrylate | — | 45.0 |
| | Methacrylic acid | — | 3.3 |
| | 2-hydroxy-4-allyloxy benzophenone(copolymerizable UV light absorber) | | 4.9 |

These materials are added and reacted as follows:

(8) Charge B-3 is added in 60 seconds.
(9) Charge B-4 is added over 45 minutes.
(10) Temperature is raised to 190° F. in 10 minutes, and then it is maintained for 1 hour.
(11) The contents of the kettle are cooled to room temperature, and the latex is discharged through a 40 mesh screen.

The resulting product is a true core-shell polymer which, in latex form, has the following properties:
a. Solids, %: 42.3±2
b. Coagulum, %: <0.5%
c. Residual monomers: 0.4% ±0.1 by gas chromatography
d. Surface tension, dyne/cm: 53.5±3
e. pH: 4.5±0.5
e. Brookfield viscosity LV (1-60): 170±70
g. Turbidity: 3.2±0.2
h. Mechanical stability: good This material is formed into a film by pouring a latex into a leveled mold, evaporating water at ambient conditions then curing the cast film at 300° F. for 5 minutes.

The film has the following properties:
a. Tensile strength, psi: 529±50
b. Elongation, %: 2050±200
c. Clarity: good
d. Water spot test: none The latex is used as a binder for a print paste consisting of a thickener and a colorant. The print paste is transferred onto polyester/cotton fabric by means of a flat bed screen and squeegee. The printed fabric is then tested for crock fastness, by AATCC crockmeter method #8-1974—5 best, 1 poor, hand by subjective rating—5 softest, 1 stiffest and cyclic aging by fade-o-meter (carbon arc-20 hours) followed by IIIA wash cycle (AATCC method #61-1975). The same printing and testing procedure is conducted for the following other polymers:

| | Core | | | Shell | | | |
|---|---|---|---|---|---|---|---|
| Sample | % Total | % Styrene | % Butadiene | % Total | % BMA | % MAA | % MA |
| A | 100 | 45 | 51 | 0 | 0 | 0 | 0 |
| B | 76 | 45 | 51 | 24 | 100 | 0 | 0 |
| C | 80 | 45 | 51 | 20 | 33.33 | 0 | 66.66 |
| D | 85 | 45 | 51 | 15 | 66.66 | 0 | 33.33 |
| Example | 90 | 34.8 | 55 | 10 | 54.1 | 3.2 | 42.7 |

The results where 1 is poor and 5 is best, are as follows:

| | Crock | | | Cyclic | Redispersibility in |
|---|---|---|---|---|---|
| | Wet | Dry | Hand | Aging | water |
| A | 2.5 | 4.0 | 4.0 | 1.0 | 1.0 |
| B | 2.0 | 3.5 | 3.0 | 3.5 | 2.0 |
| C | 1.0 | 3.0 | 3.0 | 3.5 | 5.0 |
| D | 1.5 | 3.5 | 3.0 | 3.5 | 5.0 |
| Example | 3.0 | 4.5 | 5.0 | 4.0 | 5.0 |

The above description is for the purpose of teaching those skilled in the art how to practice the invention and is not meant to recite all those possible modifications and variations of it which will become apparent from reading this description. It is intended, however, that all those obvious modifications and variations be included within the scope of the present invention which is defined by the following claims.

What is claimed is:

1. A core-shell polymer composition which comprises discrete particles comprising:
   (a) 70 to 92% based on the dry weight of the composition of discrete cores of styrene-butadiene copolymer comprising from 20 to 60% by weight of the core of styrene, from 40 to 80% by weight of the core of butadiene and from 0 to 10% by weight of the core of a copolymerizable carboxylic acid; and
   (b) 8 to 30% based on the dry weight of the composition of shells of a copolymer of butyl methacrylate and methyl acrylate formed integrally with and at least partly covering the cores, the copolymer comprising from 45 to 55% by weight of the shell of butyl methacrylate, from 35 to 45% by weight of the shell of methyl acrylate, and from 0 to 10% based on the weight of the shell of methacrylic acid.

2. A core-shell polymer composition according to claim 1 wherein the styrene-butadiene copolymer comprises from 20 to 37% styrene, from 53 to 70% butadiene and from 1 to 5% of a combination of itaconic acid and methacrylic acid, all percentages based on the weight of the core.

3. A core-shell polymer composition according to claim 1 wherein the copolymer of butyl methacrylate and methyl acrylate comprises from 47 to 52% butyl methacrylate, from 37 to 42% methyl acrylate, and from 1 to 5% methacrylic acid, all amounts being based on the weight of the shell.

4. A core-shell polymer composition according to claim 1 wherein the discrete particles of core-shell polymer have a number average diameter of from 0.1 to 0.5 micron.

5. A core-shell polymer composition according to claim 4 wherein the discrete particles of core-shell polymer have a ratio of number average diameter to the weight average diameter within the range of from 1.001 to 5.

6. A core-shell polymer composition according to claim 1 wherein the styrene-butadiene copolymer forming the core comprises from 1 to 5% based on the weight of the core of the copolymerizable carboxylic acid.

7. A core-shell polymer composition according to claim 1 wherein the copolymerizable carboxylic acid is a member selected from the group consisting of itaconic acid, methacrylic acid and combinations of these.

8. A core-shell polymer composition according to claim 7 wherein the styrene-butadiene copolymer comprises from 20 to 37% styrene, from 53 to 70% butadiene and from 1 to 5% of a combination of itaconic acid and methacrylic acid, all percentages based on the weight of the core.

9. A core-shell polymer according to claim 8 wherein the copolymer of butyl methacrylate and methyl acrylate comprises from 47 to 52% butyl methacrylate, from 37 to 42% methyl acrylate, and from 1 to 5% methacrylic acid, all amounts being based on the weight of the shell.

10. A process for applying colored patterns of a textile comprising the steps of:
   (a) forming a dispersion of a pigment and a binder comprising a composition according to claim 1 in water;
   (b) contacting a textile with a screen printing mask having a pattern wherein;
   (c) passing the dispersion of pigment and binder through the screen and onto the textile in the pattern; and
   (d) heating the fabric to fuse the binder and fix the pigment to the textile.

11. A screen print binder comprising the composition defined in claim 1.

* * * * *